US011027613B2

(12) United States Patent
Lee et al.

(10) Patent No.: US 11,027,613 B2
(45) Date of Patent: Jun. 8, 2021

(54) REGENERATIVE BRAKING CONTROL SYSTEM AND METHOD

(71) Applicant: Ford Global Technologies, LLC, Dearborn, MI (US)

(72) Inventors: Jinkoo Lee, Ann Arbor, MI (US); Dale Scott Crombez, Livonia, MI (US); Daniel A. Gabor, Canton, MI (US); Kerem Bayar, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/171,413

(22) Filed: Feb. 3, 2014

(65) Prior Publication Data

US 2015/0217643 A1    Aug. 6, 2015

(51) Int. Cl.
| | | |
|---|---|---|
| *B60L 3/10* | (2006.01) | |
| *B60L 7/18* | (2006.01) | |
| *B60L 7/12* | (2006.01) | |
| *B60L 15/20* | (2006.01) | |
| *B60L 50/52* | (2019.01) | |
| *B60L 7/10* | (2006.01) | |

(52) U.S. Cl.
CPC ............... *B60L 3/102* (2013.01); *B60L 3/108* (2013.01); *B60L 7/10* (2013.01); *B60L 7/12* (2013.01); *B60L 7/18* (2013.01); *B60L 15/2009* (2013.01); *B60L 50/52* (2019.02); *B60L 2240/12* (2013.01); *B60L 2240/423* (2013.01); *B60L 2240/465* (2013.01); *B60L 2250/26* (2013.01); *Y02T 10/64* (2013.01); *Y02T 10/70* (2013.01); *Y02T 10/72* (2013.01)

(58) Field of Classification Search
CPC .... B60L 7/10; B60L 7/18; B60L 3/102; B60L 7/12; B60L 3/108; B60L 15/2009; B60L 50/52; B60L 2250/26; B60L 2240/423; B60L 2240/12; B60L 2240/465; Y02T 10/64; Y02T 10/70; Y02T 10/72
USPC ...................................................... 701/22, 71
See application file for complete search history.

(56) References Cited

U.S. PATENT DOCUMENTS

| | | | |
|---|---|---|---|
| 5,707,115 A | 1/1998 | Bodie et al. | |
| 6,275,763 B1 * | 8/2001 | Lotito et al. | ..................... 701/71 |
| 6,709,075 B1 * | 3/2004 | Crombez | ................ B60L 3/102 |
| | | | 303/152 |

(Continued)

FOREIGN PATENT DOCUMENTS

| | | | |
|---|---|---|---|
| EP | 0906857 B1 | 8/2004 | |
| KR | 20080037344 A | * | 4/2008 |

OTHER PUBLICATIONS

Machine Translation: Yang et al., KR 20080034344 A, Apr. 30, 2008, Korean Patent Publication.*

*Primary Examiner* — Nadeem Odeh
(74) *Attorney, Agent, or Firm* — David Kelley, Esq.; Tung & Associates

(57) ABSTRACT

A regenerative braking control system includes at least one sensor adapted to sense a front tire impact event and transmit a sensor signal responsive to the front tire impact event during vehicle braking and a regenerative powertrain interfacing with the at least one sensor and adapted to reduce regenerative braking torque responsive to receiving the sensor signal from the at least one sensor. A regenerative braking control method is also disclosed.

20 Claims, 1 Drawing Sheet

(56) References Cited

U.S. PATENT DOCUMENTS

| | | | |
|---|---|---|---|
| 7,104,617 B2 * | 9/2006 | Brown | B60K 6/44 |
| | | | 303/152 |
| 2006/0102394 A1 * | 5/2006 | Oliver | B60K 6/12 |
| | | | 180/65.24 |
| 2007/0108838 A1 * | 5/2007 | Shaffer et al. | 303/152 |
| 2010/0127562 A1 | 5/2010 | Yokoyama et al. | |
| 2011/0130937 A1 * | 6/2011 | Krueger | B60L 3/10 |
| | | | 701/74 |
| 2012/0133202 A1 * | 5/2012 | Mui | B60L 3/10 |
| | | | 303/152 |
| 2012/0265419 A1 * | 10/2012 | Kim | B60L 3/104 |
| | | | 701/71 |

* cited by examiner

REGENERATIVE BRAKING CONTROL SYSTEM AND METHOD

FIELD

Illustrative embodiments of the disclosure generally relate to regenerative braking. More particularly, illustrative embodiments of the disclosure relate to a regenerative braking control system and method which facilitate enhanced control of regenerative braking without compromising vehicle stability during front tire impact events.

BACKGROUND

To improve fuel economy, hybrid electric vehicles (HEVs) may utilize regenerative (regen) braking, in which kinetic energy is converted by an electric machine into storable energy during braking and then made available for vehicle propulsion. During front tire impact events as occur when one or both front tires of the vehicle encounter a bump, pothole, patch of ice or the like, regenerative braking may not be modified accordingly, potentially compromising regenerative braking efficiency.

Accordingly, a regenerative braking control system and method which facilitates enhanced control of regenerative braking without compromising vehicle stability during front tire impact events is needed.

SUMMARY

Embodiments of the disclosure are generally directed to a regenerative braking control system. An illustrative embodiment of the regenerative braking control system includes at least one sensor adapted to sense a front tire impact event and transmit a sensor signal responsive to the front tire impact event during vehicle braking and a regenerative powertrain interfacing with the at least one sensor and adapted to reduce regenerative braking torque responsive to receiving the sensor signal from the at least one sensor.

Embodiments of the disclosure are further generally directed to a regenerative braking control method. An illustrative embodiment of the regenerative braking control method includes determining whether a front tire impact event is occurring during vehicle braking and reducing application of regeneration torque if the front tire impact event is occurring.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
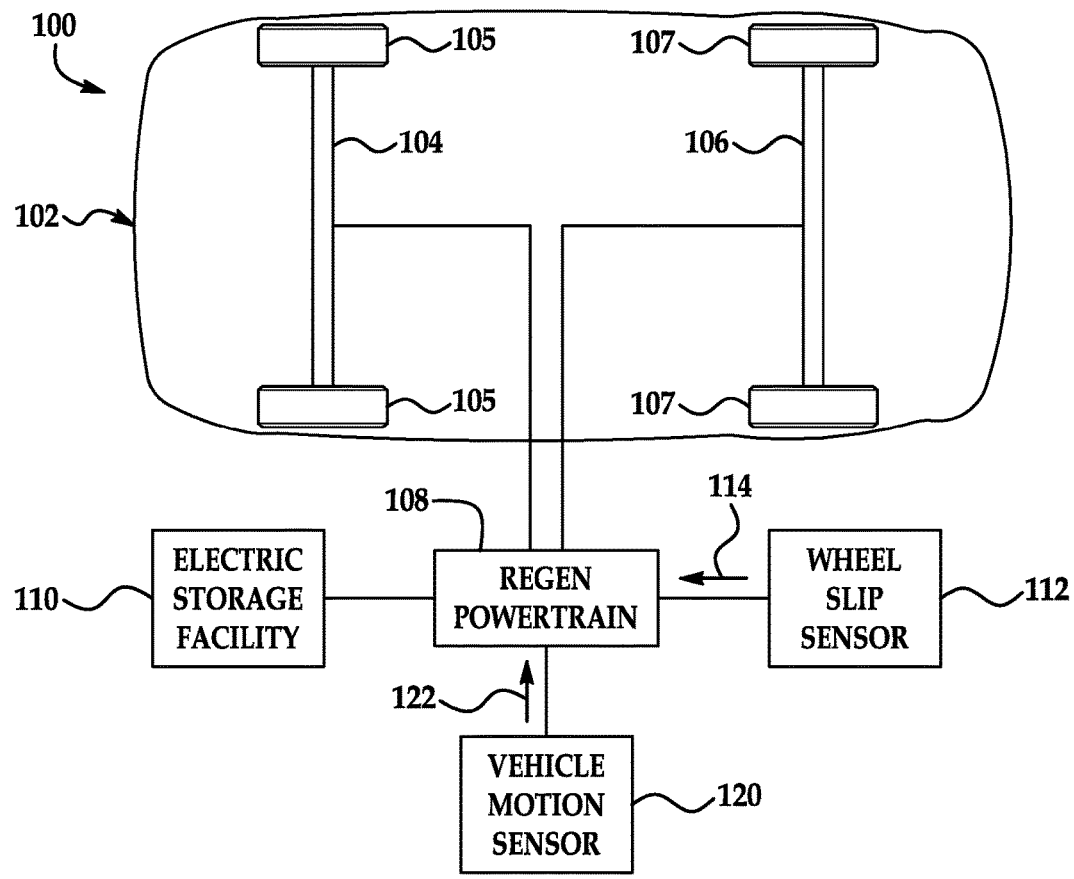
FIG. 1 is a schematic block diagram of an illustrative embodiment of the regenerative braking control system.

Referring initially to FIG. 1, an illustrative embodiment of the regenerative braking control system, hereinafter system, is generally indicated by reference numeral 100. The system 100 may include a vehicle 102. In some embodiments, the vehicle 102 may include a hybrid electric vehicle (HEV) or a plug-in hybrid electric vehicle (PHEV), for example and without limitation. The vehicle 102 may have a front axle 104 with a pair of front wheels 105 and a rear axle 106 with a pair of rear wheels 107. In some embodiments, the vehicle 102 may be driven by the rear wheels 107.

A regenerative powertrain 108 may interface with at least one of the front axle 104 and the rear axle 106 of the vehicle 102. In some embodiments, the regenerative powertrain 108 may interface with one or more front wheels 105 and/or one or more rear wheels 107 of the vehicle 102. The regenerative powertrain 108 may be adapted to apply regenerative braking torque to the front axle 104 and/or the rear axle 106 during braking of the vehicle 102, typically in the conventional manner. The regenerative powertrain 108 may be adapted to convert mechanical power from the rotating front axle 104 and/or rear axle 106 into electrical power. The electrical power may be stored in a battery or other suitable electrical storage facility 110 which electrically interfaces with the regenerative powertrain 108. The electrical power which is stored in the electrical storage facility 110 may be used in propulsion of the vehicle 102 such as in the conventional manner.

At least one wheel slip sensor 112 may interface with the regenerative powertrain 108. The wheel slip sensor 112 may interface with the front wheels 105 and/or the rear wheels 107 of the vehicle 102 as is known by those skilled in the art. During operation of the vehicle 102, the wheel slip sensor 112 may be adapted to detect wheel slip events of the front wheels 105 and/or the rear wheels 107 of the vehicle 102 using a limited slip control detection algorithm such as in the conventional manner. The wheel slip sensor 112 may be further adapted to transmit a wheel slip sensor signal 114 which indicates the wheel slip events to the regenerative powertrain 108. In some embodiments, the wheel slip sensor 112 may be adapted to detect wheel slip events at the front wheels 105 and responsively transmit the wheel slip sensor signal 114 to the regenerative powertrain 108 in the event that the front wheels 105 encounter a front tire impact event such as a bump, pothole, ice patch or the like.

In some embodiments, at least one vehicle motion sensor 120 may interface with the regenerative powertrain 108. The vehicle motion sensor 120 may include at least one wheel speed sensor and/or at least one acceleration sensor (such as a longitudinal acceleration sensor, a lateral acceleration sensor, etc.) or deceleration sensor, for example and without limitation. The vehicle motion sensor 120 may be adapted to transmit a motion sensor signal 122 which indicates the wheel speed of at least one of the front wheels 105 and the rear wheels 107 and/or acceleration or deceleration of the vehicle 102 to the regenerative powertrain 108. In some embodiments, the vehicle motion sensor 120 may be adapted to detect wheel speed and/or vehicle acceleration or deceleration and responsively transmit the motion sensor signal 122 to the regenerative powertrain 108 in the event that the front wheels 105 encounter the front tire impact event such as a bump, pothole, ice patch or the like.

The regenerative powertrain 108 may be adapted to reduce the regenerative braking torque which is applied to the front wheels 105 and/or the rear wheels 107 in the event that the regenerative powertrain 108 receives the wheel slip sensor signal 114 and/or the motion sensor signal 122 responsive to the front tire impact event. The magnitude of regenerative braking torque reduction may be proportional to the magnitude of wheel slip which is detected at the front wheels 105 during the front tire impact event.

In exemplary application of the system 100, the regenerative powertrain 108 applies regenerative braking torque to the front axle 104 and/or the rear axle 106 during braking of the vehicle 102. The regenerative powertrain 108 generates electrical power which may be stored in the electrical storage facility 110 and may be used in propulsion of the vehicle 102.

In the event that the front wheels 105 encounter a front tire impact event during vehicle braking, the wheel slip sensor 112 may detect wheel slippage at the front wheels 105 and responsively transmit the wheel slip sensor signal 114 to the regenerative powertrain 108. Additionally or alternatively, the vehicle motion sensor 120 may detect acceleration, deceleration and/or other vehicle motion and responsively transmit the motion sensor signal 120 to the regenerative powertrain 108. The regenerative powertrain 108 may use the wheel slip and/or vehicle motion data to reduce regenerative braking torque at the rear wheels 107. The magnitude of the reduction in regenerative braking torque at the rear wheels 107 may be in proportion to the magnitude of wheel slippage which is detected by the wheel slip sensor 112 at the front wheels 105 and/or the magnitude of vehicle motion which is detected by the vehicle motion sensor 120. Therefore, the regenerative powertrain 108 may utilize the motion sensor signal 122 from the vehicle motion sensor 120 and/or the wheel slip sensor signal 114 from the wheel slip sensor 112 to inhibit regenerative braking torque during braking of the vehicle 102 and maintain stability of the vehicle 102 during the front tire impact event.

Figure 2:
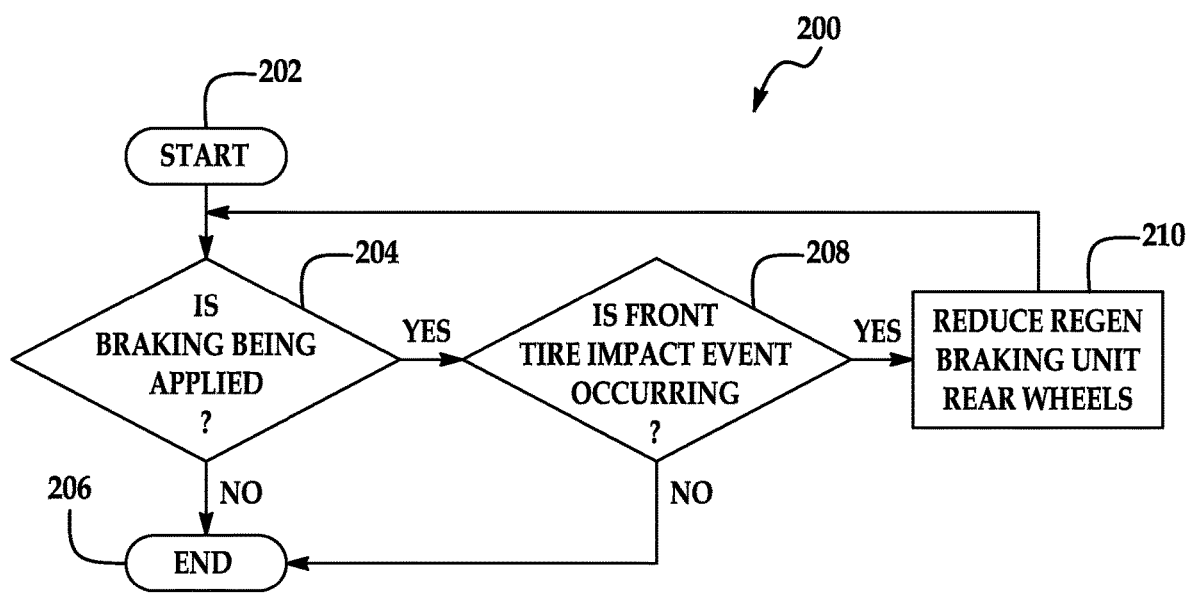
FIG. 2 is a block diagram of an alternative illustrative embodiment of a regenerative braking control method.

Referring next to FIG. 2 of the drawings, a block diagram 200 of an illustrative embodiment of a regenerative braking control method is shown. The method 200 begins at block 202. At block 204, a determination may be made as to whether vehicle braking is being applied. If vehicle braking is not being applied, then the method may end at block 206. If vehicle braking is being applied at block 204, then at block 208 a determination may be made as to whether a front tire impact event is occurring. The front tire impact event may be detected based on wheel slip data and/or vehicle motion data.

If a front tire impact event is not occurring at block 208, then the method may end at block 206. If a front tire impact event is occurring, then regenerative braking torque at the rear wheels may be reduced at block 210. The magnitude of regenerative braking reduction may be proportional to the magnitude of slip which is detected at the front wheels and/or the magnitude of vehicle motion which is detected during the front tire impact event.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A regenerative braking control system for an electric vehicle, comprising:
    at least one sensor configured to sense in response to a front tire impact event at least one of wheel slip and vehicle motion and transmit a sensor signal responsive to the front tire impact event during vehicle braking where regenerative braking torque is applied at a first level at rear wheels of the vehicle; and
    a regenerative powertrain interfacing with the at least one sensor, the regenerative powertrain configured to reduce regenerative braking torque from the first level to a current level at the rear wheels of the vehicle by a determined magnitude of reduction responsive to receiving the sensor signal from the at least one sensor at front wheels of the vehicle, the magnitude of the reduction of the regenerative braking torque at the rear wheels is determined based on and correspondingly proportional to a magnitude of the at least one of sensed wheel slip at the front wheels and vehicle motion, the regenerative powertrain configured to reduce the regenerative braking torque responsive to a determination that the front tire impact event is occurring during vehicle braking, the determination of whether the front tire impact event is occurring and corresponding reduction of regenerative braking torque repeating continuously if it is determined that vehicle braking is currently being applied and the front tire impact event is occurring.

2. The system of claim 1 wherein the vehicle comprises a hybrid electric vehicle.

3. The system of claim 1 wherein the vehicle comprises a plug-in hybrid electric vehicle.

4. The system of claim 1 further comprising an electrical storage facility interfacing with and configured to store electrical power from the regenerative powertrain.

5. The system of claim 1 wherein the regenerative powertrain is configured to apply regenerative braking torque to at least one of a front axle and a rear axle of the vehicle.

6. The system of claim 5 wherein the regenerative powertrain is configured to reduce regenerative braking torque at the rear axle of the vehicle responsive to receiving the sensor signal from the at least one sensor.

7. The system of claim 1 wherein the regenerative powertrain is configured to apply regenerative braking torque to a selected one of the front wheels and the rear wheels of the vehicle.

8. The system of claim 7 wherein the regenerative powertrain is configured to reduce regenerative braking torque at the rear axle of the vehicle responsive to receiving the sensor signal from the at least one sensor.

9. A regenerative braking control system for an electric vehicle, comprising:
    at least one of a wheel slip sensor and a vehicle motion sensor configured to respectively sense at least one of wheel slip and vehicle motion responsive to a front tire impact event and transmit at least one of a wheel slip sensor signal and a vehicle motion sensor signal, respectively, responsive to a front tire impact event during vehicle braking where regenerative braking torque is applied at a first level at rear wheels of the vehicle; and
    a regenerative powertrain interfacing with the at least one sensor, the regenerative powertrain configured to reduce regenerative braking torque from the first level to a current level at the rear wheels of the vehicle by a determined magnitude of reduction responsive to receiving the at least one of a wheel slip sensor signal and a motion sensor signal from the at least one of a wheel slip sensor at front wheels of the vehicle and a vehicle motion sensor, the magnitude of the reduction of the regenerative braking torque at the rear wheels is determined based on and correspondingly proportional to a magnitude of the sensed at least one of wheel slip at the front wheels and vehicle motion responsive to the front tire impact event, the regenerative powertrain configured to determine a magnitude of the sensed at least one of wheel slip and vehicle motion, the regenerative powertrain configured to reduce the regenerative braking torque responsive to a determination that the front tire impact event is occurring during vehicle braking, the determination of whether the front tire impact event is occurring and corresponding reduction of regenerative braking torque repeating continuously if it is determined that vehicle braking is currently being applied and the front tire impact event is occurring.

10. The system of claim 9 wherein the vehicle comprises a hybrid electric vehicle.

11. The system of claim 9 wherein the vehicle comprises a plug-in hybrid electric vehicle.

12. The system of claim 9 further comprising an electrical storage facility interfacing with and configured to store electrical power from the regenerative powertrain.

13. The system of claim 9 wherein the regenerative powertrain is configured to apply the regenerative braking torque to at least one of a front axle and a rear axle of the vehicle.

14. The system of claim 13 wherein the regenerative powertrain is configured to reduce the regenerative braking torque at the rear axle of the vehicle responsive to receiving the sensor signal from the at least one sensor.

15. The system of claim 9 wherein the regenerative powertrain is configured to apply the regenerative braking torque to a selected one of the front wheels and the rear wheels of the vehicle.

16. The system of claim 15 wherein the regenerative powertrain is configured to reduce the regenerative braking torque at the rear axle of the vehicle responsive to receiving the sensor signal from the at least one sensor.

17. A regenerative braking control system method comprising a regenerative powertrain receiving sensor signals and in response causing steps including, reducing application of regenerative braking torque from a first level to a current level of applied regenerative braking torque at rear wheels of the vehicle by a determined magnitude of reduction when at least one of wheel slip at front wheels of the vehicle and vehicle motion of a vehicle is sensed in response to a front tire impact event, the magnitude of the reduction of the regenerative braking torque is determined based on and correspondingly proportional to a magnitude of the at least one of sensed wheel slip at the front wheels and vehicle motion in response to the front tire impact event, the regenerative powertrain configured to reduce the regenerative braking torque responsive to a determination that the front tire impact event is occurring during vehicle braking, the determination of whether the front tire impact event is occurring and corresponding reduction of regenerative braking torque repeating continuously if it is determined that vehicle braking is currently being applied and the front tire impact event is occurring.

18. The method of claim 17 wherein the wheel slip is in response to the front tire impact event.

19. The method of claim 17 wherein the vehicle motion is in response to the front tire impact event.

20. The method of claim 17 wherein reducing application of regeneration torque in response to the front tire impact event comprises reducing application of the regenerative braking torque at rear wheels of the vehicle in response to the vehicle motion.

\* \* \* \* \*